United States Patent Office 2,718,144
Patented Sept. 20, 1955

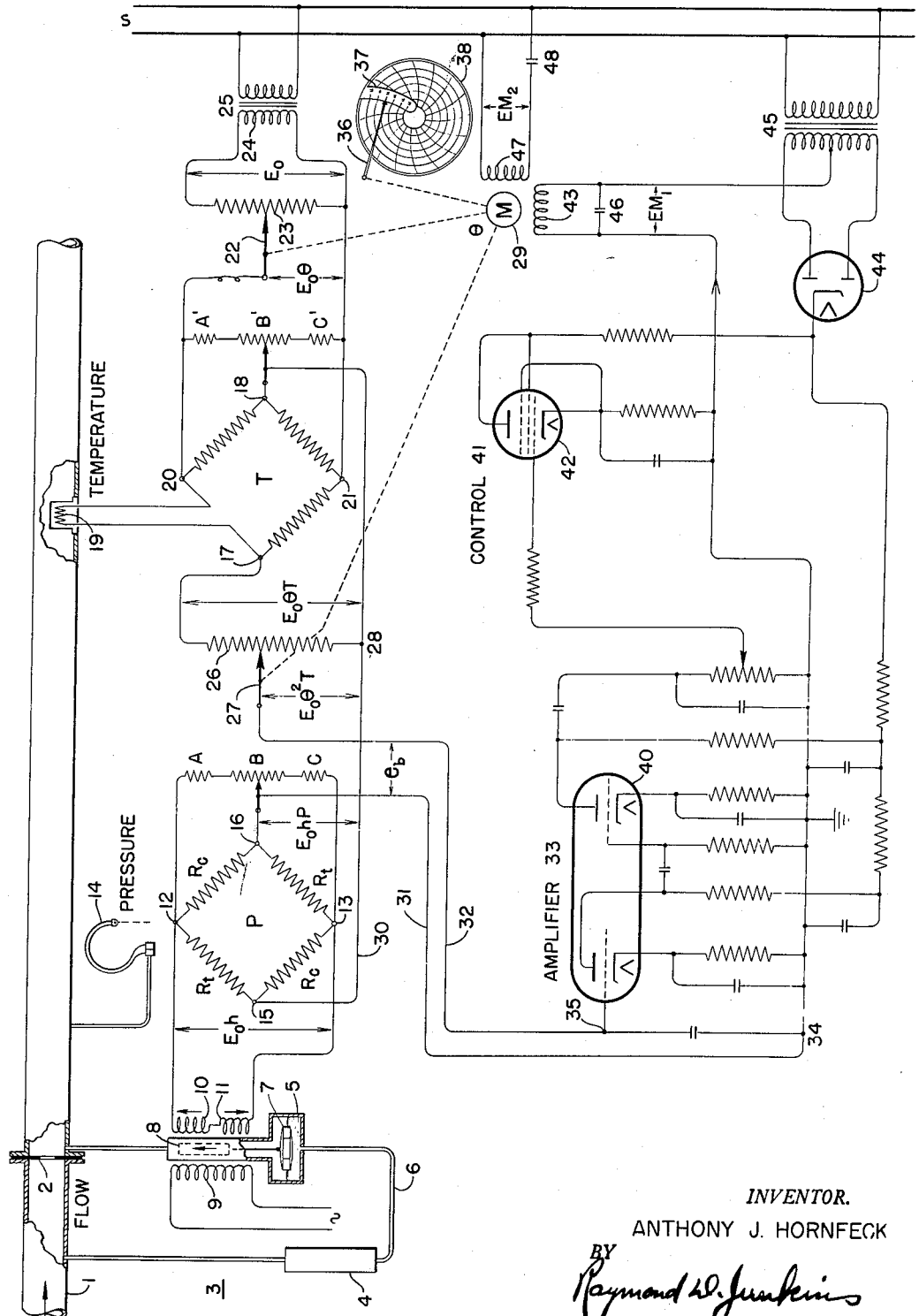

2,718,144

METERING SYSTEM

Anthony J. Hornfeck, Lyndhurst, Ohio, assignor to Bailey Meter Company, a corporation of Delaware Application March 18, 1950, Serial No. 150,363

12 Claims. (Cl. 73—205)

This invention relates to electrical measuring and control systems, and particularly to balanceable electric networks for calculating the interrelation or functional values of variables. Such variables may be quantities, qualities, conditions, positions, or the like. For example such a variable may be the rate of flow of a fluid to be measured.

In the measurement or determination of a variable it is frequently desirable to give the result in terms of a function of the variable, or conversely it is frequently desirable to use a function of the variable in ascertaining the value of the variable. For example, in measuring or determining the volume rate of flow or weight rate of flow of a fluid through a conduit, it is more expeditious to employ the pressure differential produced by the fluid passing through a restriction in a conduit as an indication inferentially of the actual volume rate or weight rate of the fluid. A quadratic relation exists between such differential pressure and the actual rate of flow. The result, as for instance a visual indication or continuous record, is desirably to be in units of volume rate or weight rate per unit of time and frequently an integration with respect to time. Through the agency of my invention it is readily possible to have means sensitive to such a differential pressure and produce, at a local or remote location, a continuous visual indication in terms of weight rate or volume rate. In other words, to continuously extract the square root.

By way of specific example I have chosen to illustrate and describe a continuous calculating circuit involving the compensation of a fluid rate of flow for variations in its density from design conditions of density. Inasmuch as weight rate or volume rate of fluid flow is readily inferentially obtained by producing a pressure differential varying in functional relation with the rate of flow, I incorporate the extraction of the functional relation at the same time as making the necessary compensations for deviations in temperature, pressure or density of the fluid from design conditions.

It will be appreciated that I take this merely as a preferred example of variables interdependent upon each other and not as limiting.

In the drawings the figure is a schematic electric circuit for a fluid flow meter with temperature and pressure compensation.

In the drawing I show diagrammatically a balanceable electrical network primarily useful, by way of example, in connection with the measurement of a variable, such as the rate of flow of a fluid through a conduit 1.

It is common in the metering art to insert a restriction, such as an orifice plate 2, in the path of the fluid flow and thus obtain a "head" or differential pressure bearing a functional relation to rate of fluid flow through the restriction. The relation between volume flow rate and differential pressure (head) is:

$$Q = cM\sqrt{2gh} \tag{1}$$

where $Q$ = cu. ft. per sec.
$c$ = coefficient of discharge
$M$ = Meter constant (depends on pipe diameter and diameter of orifice hole)
$g$ = acceleration of gravity = 32.17 ft. per sec. per sec.
$h$ = differential head in ft. of the flowing fluid The coefficient of discharge remains substantially constant for any one ratio of orifice diameter to pipe diameter regardless of the density or specific volume of the fluid being measured. With $c$, $M$ and $\sqrt{2g}$ all remaining constant then $Q$ varies as $\sqrt{h}$.

If it is desired to measure the flowing fluid in units of weight then Equation 1 becomes:

$$W = cM\sqrt{2ghd} \tag{2}$$

where $W$ = rate of flow in pounds per sec.
$d$ = density in pounds per cu. ft. of the flowing fluid
$h$ = differential head in inches of a standard fluid such as water
$M$ = meter constant now including a correction between the density $d$ of the flowing fluid being measured and the density of the liquid in the manometer which is some standard such as water In each case, whether the measurement is in volume rate or in weight rate, it will be observed that the rate varies as $\sqrt{h}$, i. e., as the square root of the differential pressure measured across the orifice or other restriction 2.

It will further be noted that when a measurement in terms of weight rate of flow is desired the $d$ in Equation 2 is representative of density in pounds per cu. ft. of the flowing fluid under expected or design conditions of density. In other words, the flow metering system is designed to have a maximum capacity in weight rate of flow of fluid at a certain density, and the density of most fluids is a function of the fluid temperature and pressure. If the fluid is a true gas the relation of actual density to design density is directly with change in pressure and inversely with change in temperature. In accurately measuring the weight rate of fluid flow it becomes necessary, therefore, to continuously ascertain the density, or some function of the density, of the fluid as it is flowing past the point of measurement. If the actual density condition deviates from the design density condition, then a correction factor should be applied to the weight rate inferentially indicated as differential pressure or head.

Under certain conditions one of the variables of which density is a function, for example, either temperature or pressure, may remain constant and only one of them fluctuate. In this event a correction of the volume flow rate should be made for the fluctuating function of density so that a correct weight rate measurement will be obtained.

Numerous complicated metering arrangements have been proposed and used for extracting the square root relationship between head and rate. The simplest possible form of U-tube manometer with a float on the mercury in one leg will provide a measurement of the differential pressure. The complication occurs in the mechanism necessary to translate such float motion into terms of rate of flow.

In a large percentage of applications it is desired to provide one or more remote indications (or recordings) of the flow measurement. Various telemetric schemes have been proposed and used, either hydraulic, pneumatic or electrical.

My invention, as illustrated by the drawing, provides a simple and accurate solution of the problems above stated, namely, a remote visual indication of the measurement of a fluid flow in terms of weight rate compensated for corrected for deviations in actual density of the flowing fluid from design density as indicated by changes in temperature and/or pressure of the fluid.

Referring now specifically to the drawing, I show a flow meter 3 comprising a U-tube having legs 4 and 5 joined by a tube 6. A sealing liquid, such as mercury, partially fills the U-tube. On the surface of the mercury in leg 5 is a float 7 adapted to position a magnetic member such as a core piece 8 within a portion of the leg 5 of non-magnetic material.

The meter 3, which I will term the transmitter, comprises a movable core transformer having a primary alternating current energized winding 9 and a pair of bucking secondary windings 10, 11. The bucking secondary windings 10, 11 are inductively energized from the primary winding 9 through the agency of the core 8. When the core is in a central or neutral location relative the windings 9, 10 and 11 a voltage $E_0=0$ exists across the terminals 12, 13. When the core is moved from neutral position toward one end of the coil assembly a voltage $E_0h$ is developed as a function of core position and therefore of differential head ($h$) across the orifice restriction 2. The relation is linear over the operating range and $E_0h$ varies from zero to a maximum finite value for values of ($h=$zero) to values of ($h=$maximum) under design conditions corresponding to maximum range of the apparatus. The voltage $E_0h$ will always be of the same phase because the movement of core 8 never crosses the electrical neutral of 10, 11.

The voltage $E_0h$ across the terminals 12, 13 provides the voltage supply for a Wheatstone bridge (P) having four resistance legs of which two are designated $R_t$ and two are designated $R_c$. The four resistance legs form the two tension and the two compression resistance elements of a strain gage, pressure-sensitive to the static pressure of the fluid flowing in the conduit 1. I have diagrammatically shown a pressure sensitive element at 14 as of the Bourdon tube type for pressure actuating the strain gage bridge elements, although the device 14 may comprise a diaphragm or other pressure sensitive instrumentality.

Such a pressure sensitive strain gage bridge is shown, for instance in Patent 2,470,714 issued May 17, 1949, to Nevius for Electric Pressure Indicator and need not be further described here. When supplied with an input voltage $E_0h$ across the terminals 12, 13 it will develop at its output terminals 15, 16 a voltage $E_0hP$ in functional relation to the existing differential head and the existing static pressure of the flowing fluid, to the end that the resultant voltage $E_0hP$ is directly representative of differential head multiplied by a pressure value.

The bridge P differs from the usual concept of a Wheatstone bridge in that it is never balanced at any working pressure. The values of the resistance legs are so chosen that for a constant input voltage applied to terminals 12, 13 there will be an output voltage across output terminals 15, 16 bearing a definite (preferably linear) relation to the static pressure in conduit 1 which mechanically strains the tension elements $R_t$ and the compression elements $R_c$. If the input voltage across terminals 12, 13 is variable (as $E_0h$ is with relation to the position of core 8) then the output voltage across 15, 16 has a value $E_0hP$.

Connected across the terminals 12, 13 I show fixed resistances A, C and an adjustable resistance B. The arrangement allows handling of what is referred to as a suppressed range of pressure. Assume, for example, that the expected variations in pressure within the conduit 1 fall within the range 300 to 500 p. s. i. Greater sensitivity and accuracy will be obtained if the instrument is designed and calibrated for a suppressed range of 300–500 than if calibrated for a range of 0–500. Resistances A, B and C give the possibility by allowing a biasing of the bridge P effective for all values of input voltage $E_0h$.

If the desired pressure range starts at zero then B is adjusted so that Bridge P is balanced for zero pressure at any input voltage $E_0h$. Thus the output $E_0hP$ would be zero, regardless of $E_0h$ when pressure is zero.

If the desired pressure range is, for example, 300–500 p. s. i., the bridge is normally designed to be unstrained and in balance at pressures below 300 p. s. i. Resistance B allows an initial unbalance equivalent of 300 p. s. i., so that for an operating pressure range of 300–500 p. s. i. the output voltage P will be directly representative of pressure and the voltage $E_0hP$ will represent the actual value of head for the actual pressure.

A second Wheatstone bridge T provides a voltage output at terminals 17, 18 in functional relation to the actual temperature of the fluid in the conduit 1. To this end the Wheatstone bridge T has four arms of which the arm 19 comprises a resistance thermometer element sensitive to temperature of the flowing fluid and producing an unbalance of the bridge and an output voltage varying with fluid temperature.

The input terminals 20, 21 of the bridge T are supplied with a voltage $E_0\theta$ as determined by the position of a movable contact arm 22 along a resistance 23 which latter bridges the secondary 24 of a transformer 25. The voltage output of the secondary 24 is designated as $E_0$ and the mechanical positioning of the arm 22, or percentage of its possible motion over the resistance 23 is designated as $\theta$. Therefore, the voltage input at terminals 20, 21 is equal to $E_0\theta$.

With the bridge T supplied with an adjustable voltage $E_0\theta$ the output of the bridge T across the terminals 17, 18 is equal to $E_0\theta T$ and this is applied across a fixed resistor 26 having a movable contact arm 27, to the end that the voltage between the contact arm 27 and a terminal 28 is $E_0\theta^2 T$ when the two contact arms 22 and 27 are simultaneously moved in the same direction a distance, or proportionate distance $\theta$, by a common driving motor 29. It is a matter of practical design that potentiometers 22, 23 and 26, 27 are located at opposite sides of the bridge T. If grouped on one side only it would increase the difficulty of design and range for production of the voltage $E_0\theta^2 T$ for comparison with voltage $E_0hP$.

The circuit components so far described are included in a balanceable network having a conductor 30 which joins the terminals 15, 28 and 18. The terminals 16 and 27 are joined by conductors 31, 32 respectively to an amplifier 33 which is sensitive to the phase and magnitude of any unbalance of voltage in the balanceable network. Considering the network as a whole a voltage $e_b$ is representative of unbalance voltage across the conductors 31, 32 and when $e_b=0$ the network is in balance.

When I speak of the phase of the unbalance voltage $e_b$ I mean the direction of unbalance, as to whether $E_0\theta^2 T$ predominates over $E_0hP$, or vice versa. The phase of the voltage $E_0h$ does not reverse because all mechanical movement of core 8 is in one direction from the electrical neutral of transformer 9, 10, 11. Furthermore, the phase of input voltage $E_0$ remains constant as predetermined. Thus the phase of voltage $e_b$ is determined by, and is representative of, direction of unbalance of the network as a whole.

The final voltage across the terminals 27, 28 is proportional to temperature times the square of the angular movement of the arms 22 and 27. At balance this voltage $E_0\theta^2 T$ must equal the voltage output of the strain gage or $E_0hP$. Consequently, at balance the value $\theta$ or the movement of the slidewire arms 22 and 27 is proportional to the square root of the differential pressure drop multiplied by the density correction factor and this of course is corrected flow.

At balance $$e_b=0$$
$$E_0hP=E_0\theta^2 T$$

or $$\theta=\sqrt{\frac{hP}{T}}=\text{corrected flow}$$

It will be appreciated that the unbalance signal $e_b$ appearing at the terminals 34, 35 as input to the amplifier 33 may be of zero value or of a phase and magnitude depending respectively upon the direction and magnitude of unbalance of the measuring network. In other words if the voltage $E_0hP$ predominates over the voltage $E_0\theta^2T$ then the unbalance signal $e_b$ will be of predetermined phase while if the voltage $E_0\theta^2T$ predominates over $E_0hP$ the unbalance signal $e_b$ will be of opposite phase. In either event the magnitude of the voltage $e_b$ will depend upon the extent of unbalance between the conductors 31, 32.

For positioning the balancing arms 22, 27 I have indicated a motor 29 which is also arranged to position an indicator 36 relative to an index 37 and to a revoluble chart 38. Proportionate simultaneous movement of the elements 22, 27, 36, by the motor 29, is designated as $\theta$.

Between the A.-C. input signal $e_b$ at terminals 34, 35 and the motor 29 is a two stage amplifier 33 including a double triode electron tube 40. The signal $e_b$ of one phase acts through the amplifier 33 (which is phase sensitive) and through a motor control section 41 to cause rotation of the motor 29 in predetermined direction to position the arms 22 and 27 to vary the voltage $E_0\theta^2T$ to rebalance the network.

As previously stated the phase of the voltage $e_b$ depends upon the direction of unbalance between the conductors 31, 32. Likewise the phase of the output voltage of the amplifier 33 will depend upon the sense of unbalance. All or part of the output voltage of the amplifier is impressed upon the motor control circuit 41. The motor control circuit is arranged to sense the phase of the output of the amplifier and consequently the unbalance of the measuring circuit and is therefore adapted to effect an operation of the motor 29 to rebalance the measuring circuit.

The control circuit consists of a single tube 42, preferably of the high Gm or mutual conductance type, such as the 6AG7. This tube is connected in series with a control winding 43 of the motor 29.

The plate voltage for the tube 42 is unfiltered pulsating D.-C. voltage obtained from a full wave rectifier tube 44 of the 6X5 type, receiving its power from a transformer 45 connected to the alternating current power source. The voltage output of the amplifier 33, produced by an unbalance of the measuring circuit, is applied to the grid of the motor control tube 42. This voltage applied to the control grid will cause an increase in the no-load plate current during the half cycle when it is in phase with the plate voltage and a decrease during the half cycle when it is out of phase. As a result, with a large grid signal, half wave pulses of D.-C. current will flow into the motor circuit comprised of the control winding 43 and a capacitor 46 in parallel. The phase of this pulsating current depends on the phase of the grid signal, and consequently on the direction of unbalance of the measuring circuit.

The motor 29 is in effect a two-phase motor which may be described as being a capacitor-run induction motor having a two phase stator winding and a high resistance squirrel cage type rotor. There are two identical but separate windings 43, 47, the winding 47 being connected in series with a capacitor 48 across the alternating current power line so that its voltage $EM_2$ leads the line voltage by nearly 90°. The capacitor 48 is chosen so that it is in resonance with the inductance of the winding 47 at the operating frequency and forms a series resonant circuit. This results in a voltage across the winding 47 which is approximately double the line voltage for the particular motor used.

The second winding 43, which I will term the control winding, while identical with the first winding 47 in construction, differs in that it has a capacitor 46 connected in parallel across it. The capacitor 46 is designed to produce a condition of parallel resonance at 60 cycles.

The plate of the motor control tube 42 is always positive. At balance, some current flows during each half cycle of the applied plate voltage, but since this current is only slightly pulsating direct current and has no fundamental component of supply line frequency, no output torque on the motor is produced. Any tendency of the rotor to coast is restrained by the damping action of the D.-C. component which applies a braking action. As balance is approached from an unbalance condition there results a reduction in the fundamental component of supply line frequency in the output circuit of tube 42 and a consequent and simultaneous increase in the D.-C. component which produces a dynamic braking action and prevents over travel.

It will thus be seen that the circuit described in connection with the drawing provides a balanceable calculating network controlling a motor 29 whose travel $\theta$ is representative of the square root of the differential pressure drop multiplied by the density correction factor in connection with the fluid flowing through conduit 1. Inasmuch as the indicator arm 36 is moved simultaneously with the balacing potentiometer arms 22 and 27 a position of the arm 36 relative to the index 37 and to the revoluble chart 38 is at all times representative of the value of corrected fluid flow rate and shows changes therein. I have thus provided an extremely simple and accurate calculating circuit, sensitive to a variable or to a function of a variable, compensated for certain changes in the variable, and producing a visual manifestation of the variable so compensated. Certain portions of the balancing circuit may comprise a telemetering distance between a transmitter and a receiver if desired. The circuit is particularly useful where it is not necessary or desirable to visually indicate or record the value of temperature and/or of pressure of the flowing fluid but merely to utilize their deviations from design value in automatically compensating or correcting the differential head to obtain a corrected flow rate.

While I have illustrated and described a preferred embodiment of my invention, it will be understood that this is by way of example only and not to be considered as limiting.

Certain features of my invention, disclosed but not claimed herein, form the subject matter of my divisional application S. N. 501,041 filed April 13, 1955.

What I claim as new and desire to secure by Letters Patent of the United States, is:

1. In a metering system, in combination, a balanceable electric network including a transducer for converting a function of a primary variable to an A.-C. potential representative in magnitude of the function, a source of A.-C. potential for opposing that from the transducer, means for selecting a portion of said source potential and opposing it to the transducer output potential, means responsive to the direction and amplitude of the unbalance between said potentials for actuating the source potential selecting means to balance the network, a strain gage type of Wheatstone bridge connected into said network, means actuated by a secondary variable having a control relationship to the primary variable arranged to strain said bridge to keep it always unbalanced, the output of said bridge being arranged to modify one of said potentials, an indicator for moving over a scale representative of values of the primary variable, and means mechanically connecting the responsive means, indicator and potential portion selector to reduce the function to the direct value of the variable as modified by said secondary variable.

2. The metering system as defined in claim 1 in which the transducer comprises a transformer having an A.-C. energized primary winding, a secondary winding and a core movable to adjust the coupling between the windings, and a flow meter having a float whose position is indicative of pressure differential connected to move said core, and the means for actuating said strain gage comprises a pressure responsive device actuated by said secondary variable.

3. In a telemetric system, in combination, a balanceable electric network including, a transmitter comprising a transducer for converting a function of a primary variable to an A.-C. potential whose magnitude represents the function, a receiver including a source of A.-C. potential for opposing the output of the transmitter, means for selecting a portion of said source potential comprising cascaded potentiometers each having a slider, power means responsive to the direction and amplitude of the unbalance in said network for actuating said sliders for selecting a portion of the source potential to balance the network, a transducer responsive to a secondary variable having a controlling relationship to the primary variable for modifying one of said potentials including a permanently unbalanced type of Wheatstone bridge energized from the potential which it modifies, an indicator for the value of the primary variable, and means so mechanically connecting the responsive power means, indicator and potential source portion selector means as to reduce the function to and indicate the direct value of the variable as modified by said secondary variable.

4. The system of claim 3 wherein the second transducer responsive to a secondary variable for modifying one of said potentials includes a strain gage type of Wheatstone bridge, means energizing the bridge from the first transducer, and means connecting the output of the bridge with the receiver and responsive means.

5. A system for indicating the weight rate of flow of a fluid corrected for density including, a means for establishing an electrical value whose magnitude represents the differential head of the fluid flowing through a constriction, a means supplied by said electrical value as a power source responsive to the static fluid pressure of the flowing fluid and establishing an electrical output representative of differential head multiplied by the pressure compensation, an electric network responsive to fluid temperature of the flowing fluid having a supply source and an output, motion producing means sensitive to the unbalance between the varied output of the network responsive to the fluid temperature and the output of the compensated differential head network for simultaneously adjusting said supply and output of the said electric network responsive to fluid temperature, and means for indicating the motion and position of the means sensitive to the unbalance between the pressure compensated head network and the temperature network in its elimination of the unbalance as a showing of the value of the density compensated fluid flow.

6. In a metering system, in combination, a balanceable electric network including a transmitter having means for converting movement representative of a function of a primary variable to an A.-C. potential representative in magnitude of the function, a Wheatstone bridge type strain gage energized from said potential, means actuated by a secondary related variable to adjust said gage always to unbalance whereby it has an output representative of the product of the function of the first variable and the value of the secondary variable, a receiver including a source of A.-C. potential for opposing the output of the transmitter, means for selecting a portion of said source potential comprising cascaded potentiometers each having a slider, means responsive to the direction and amplitude of the unbalance in said network for actuating said sliders with equal effect for reducing the source potential to balance the network, an indicator for moving over a scale representative of values of said primary variable, and means for actuating the indicator from the said responsive means whereby to indicate directly the value of the first variable as multiplied by the second.

7. The system as defined in claim 6 in which the receiver is provided with an always unbalanced Wheatstone bridge of the temperature responsive type, said bridge being energized from said source and having its output modified by one of said potentiometers.

8. The system as defined in claim 6 in which a potentiometer is connected across the input to said bridge and has a slider connected to one output terminal of the bridge whereby the bridge is adjustably biased to provide a suppressed range for the secondary variable.

9. A meter for measuring a condition determined by different related variables including, a transformer having a primary winding and a pair of opposed secondary windings, a source of A.-C. for energizing said primary winding, a core member movable through a predetermined range to change the output of said secondary windings from zero to a predetermined maximum, means for moving said core member in one direction from zero toward maximum in response to one of said variables, a Wheatstone bridge network of a strain gage connected across said secondaries for energization thereby, means for activating said strain gage in response to changes in another variable whereby the bridge output is a portion of the potential of said secondaries representative of the product of the first two variables, a Wheatstone bridge network responsive to a third variable, means for simultaneously and proportionately varying the input and output of said last-named bridge so that the modified output potential will be representative of a product of the magnitude of the third variable and the square of the amount of variation, a circuit for connecting the product potentials in opposition, reversible means responsive to the value and direction of the potential difference in said circuit, means operatively connecting said reversible means to said means of simultaneous variation to balance said circuit, and means actuated by said reversible means for indicating the value of said condition.

10. A flowmeter comprising, in combination, a flow pipe having a restricted orifice, a U-tube connecting positions in the pipe on opposite sides of the orifice, a chamber in said tube containing a liquid, a float on said liquid, a core positioned by said float so that the core height varies as the square of the flow rate, an A.-C. energized primary coil cooperating with said core, a pair of bucking secondaries spaced along said core whereby to deliver an A.-C. potential representative of the core position and of the square of the flow, a pressure responsive element connected to said pipe, a constantly unbalanced pressure type Wheatstone bridge actuated by said element, said bridge having its input connected to said secondaries, a potentiometer energized by A.-C. and having a slider, a second Wheatstone bridge energized from the potentiometer output and having an element subject to the temperature of the fluid in said pipe, a second potentiometer connected in shunt to the output of the second bridge and having a slider, the outputs of the first bridge and second potentiometer being connected in opposition, and means responsive to the direction and magnitude of the resultant potential to directly actuate an index movable over a scale to show the rate of said flow as corrected for temperature and pressure, said responsive means being arranged to simultaneously move said sliders with equal effectivness to extract the square root of the core height and balance the circuit.

11. The flow meter as defined in claim 10 wherein one of said bridges has a potentiometer shunted across its input, a slider on said potentiometer connected to one output terminal of said bridge to provide a bias for said bridge to suppress the range of correction provided thereby.

12. A system and apparatus for denoting the value of a variable of a medium compensated by a plurality of factors of the medium including, means for establishing a first electrical value representative of the uncompensated value of the variable, means supplied by the first electrical value and sensitive to a first factor of the medium for producing a second electrical value which is representative of the variable compensated by the first factor, a power source, means supplied by the power source as an input and sensitive to a second factor of the medium to provide as an output a third electrical value representative of the second factor of the medium, means sensitive to an unbalance between the second electrical value and the third electrical value, means under the control of the means sensitive to the unbalance for restoring the balance by simultaneously and proportionately varying the input and output electrical values of the means sensitive to the second factor, and mechanism positioned by the restoring means to exhibit the value of the variable so compensated.

References Cited in the file of this patent

UNITED STATES PATENTS

| | | |
|---|---|---|
| 1,185,735 | Trood | June 6, 1916 |
| 1,573,850 | Naiman | Feb. 23, 1926 |
| 1,626,560 | Schneider | Apr. 26, 1927 |
| 1,922,194 | Brown et al. | Aug. 15, 1933 |
| 2,363,690 | Razek | Nov. 28, 1944 |
| 2,439,891 | Hornfeck | Apr. 20, 1948 |
| 2,488,221 | Moore | Nov. 15, 1949 |
| 2,530,326 | Davis | Nov. 14, 1950 |